United States Patent [19]

Kaveh

[11] Patent Number: 4,497,644
[45] Date of Patent: Feb. 5, 1985

[54] BLOWER FOR THE ATTENUATION OF FIBERS

[75] Inventor: Farrokh Kaveh, Dublin, Ohio

[73] Assignee: Owens-Corning Fiberglas Corporation, Toledo, Ohio

[21] Appl. No.: 530,918

[22] Filed: Sep. 12, 1983

[51] Int. Cl.³ .............................................. C03B 37/04
[52] U.S. Cl. ............................................ 65/14; 65/16
[58] Field of Search .................................. 65/6, 14, 16

[56] References Cited

U.S. PATENT DOCUMENTS

| 2,707,847 | 10/1955 | Anliker | 65/14 X |
| 2,810,158 | 10/1957 | Smout | |
| 3,013,299 | 12/1961 | Owens | 65/14 X |
| 3,336,125 | 8/1967 | Schachter | 65/14 |
| 3,671,210 | 6/1972 | Richardson | 65/5 |
| 3,785,791 | 1/1974 | Perry | 65/14 |

FOREIGN PATENT DOCUMENTS 142442 6/1980 German Democratic Rep. ..... 65/16

Primary Examiner—Robert L. Lindsay
Attorney, Agent, or Firm—Ronald C. Hudgens; Philip R. Cloutier; Ted C. Gillespie

[57] ABSTRACT

An annular blower for attenuating fibers comprises an annular manifold and a plurality of slots positioned circumferentially around the blower for the discharge of attenuating gas from the manifold, where the slots have an aspect ratio within the range of from about 35 to about 70.

8 Claims, 6 Drawing Figures

BLOWER FOR THE ATTENUATION OF FIBERS

TECHNICAL FIELD

This invention pertains to blowers for attenuating fibers. In one of its more specific aspects, this invention pertains to annular blowers suitable for attenuating the fibers centrifuged from a rotating spinner. A particular application for the invention is in the attenuation of glass fibers.

BACKGROUND OF THE INVENTION

The production of glass fibers by means of a rotary process is well known. In general, molten glass is fed into a spinner which revolves at high speeds. The spinner has a solid lower surface and a peripheral wall containing a multiplicity of orifices. The glass is passed by centrifugal force through the orifices of the peripheral wall in the form of small diameter fibers. Positioned circumferentially about the spinner is an annular blower. The blower typically comprises an annular manifold and a discontinuous slot for directing a plurality of gaseous jets from the manifold toward the fibers in a downward column or circumferential array. Usually the blower is supplied with attenuating air by a compressor. The gases discharged from the blower have a pulling effect on the fibers being centrifuged, and the gases serve to attenuate the fiber to its final small diameter.

In a typical blower construction, the discontinuous slot is comprised of downwardly directed openings communicating with the manifold. These openings typically have a square cross section, being 0.02 inches by 0.02 inches. Also, the lands between the openings are typically of the same dimension, 0.02 inches by 0.02 inches.

As the jets of air or other attenuating medium flow from the discontinuous slot of the blower, the velocity of the jets decreases with increasing distance from the blower. A problem encountered with conventional blowers is that when fibers of smaller diameter are desired, increased blower pressures, and therefore greater energy expenditures, are necessary. Heretofore, efforts to obtain finer fibers, and to increase the efficiency of the blowers at the same time in order to reduce energy consumption, have been unsuccessful.

STATEMENT OF THE INVENTION

According to this invention, there is provided an annular blower for attenuating fibers comprising an annular manifold and a plurality of slots positioned circumferentially around the blower for the discharge of attenuating gas from the manifold, where the slots have an aspect ratio within the range of from about 35 to about 70. By making the discontinuous slot for discharging the attenuating gas from the manifold into a plurality of very wide and very slender slots, the efficiency of the blower is greatly improved. The aspect ratio is defined at the ratio of the width of the slot (circumferential or arcuate distance) divided by the depth of the slot (radial distance). The decay rate of the airjets resulting from the large aspect ratio blower is lower than the decay rate of the airjets from conventional blowers, thereby enabling greater attenuation efficiencies.

In a more preferred embodiment of the invention, the aspect ratio of the slots is within the range of from about 40 to about 60.

In the most preferred embodiment of the invention, the aspect ratio of the slots is about 50.

In another preferred embodiment of the invention, the width of the slots is within the range of from about 5 to about 10 times the width of the lands between the slots.

According to this invention, there is also provided an annular blower for attenuating mineral fibers centrifuged from a spinner comprising an annular manifold and a plurality of slots positioned circumferentially around the blower for the discharge of attenuating gas from the manifold in a downward direction, where the slots have an aspect ratio within the range of from about 35 to about 70.

DESCRIPTION OF THE INVENTION

This invention will be described in terms of a glass fiber forming and attenuating process, although it is to be understood that the process is suitable for fibers of other materials, particularly of other mineral materials such as rock, slag and basalt.

Figure 1:
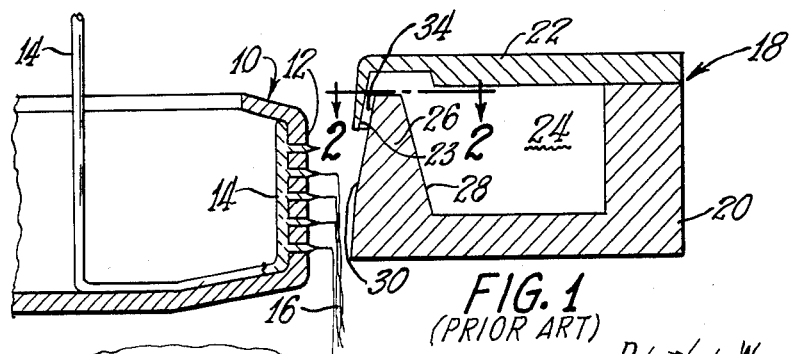
FIG. 1 is a schematic cross section view in elevation of a fiber forming spinner and blower of the prior art.
Figure 2:
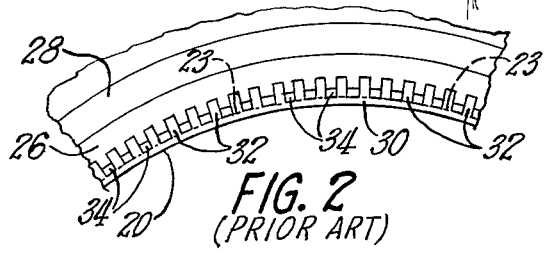
FIG. 2 is a schematic fragmentary plan view of the prior art blower body, excluding the blower cap, shown along lines 2—2 of FIG. 1.

As shown in FIGS. 1 and 2, spinner 10 has orificed peripheral wall 12. Molten glass 14 can fall as a stream and pass by centrifugal force through the orifices in the spinner peripheral wall to form fibers 16. The fibers are further attenuated into a final finer diameter by gases discharged from blower 18.

The blower is generally comprised of blower body 20 and blower cap 22, which define an annular cavity or manifold 24. The blower body is adapted with a generally vertical circumferential flange 26, which is comprised of inner flange wall 28 defining the manifold, and outer flange wall 30. Positioned between inner surface 23 of the end of the blower cap and the outer flange wall is a gap, in which is positioned a plurality of slots 32 and lands 34. As shown, the slots and lands of the prior art blower are approximately square in cross section, and of approximately equal area to each other. The lands are typically attached to the outer flange wall, and the blower cap is attached to the blower body in such a manner as to be urged toward the lands and the outer flange wall.

The manifold can be supplied with a suitable attenuating gas such as air or steam, at pressures suitable for attenuating the fibers.

Figure 5:
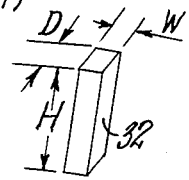
FIG. 5 is a schematic view in perspective of a typical slot or opening in a prior art blower.

As shown in FIG. 5, the slot of the prior art blower has depth D, width W and height H. The depth of the prior art slot approximately equals the width, giving the prior art slot an aspect ratio of 1.

Figure 3:
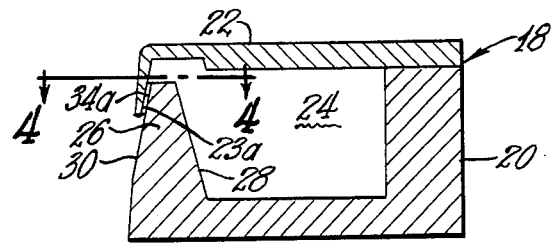
FIG. 3 is a schematic cross section view in elevation of a fiber forming spinner and blower according to the principles of this invention.
Figure 4:
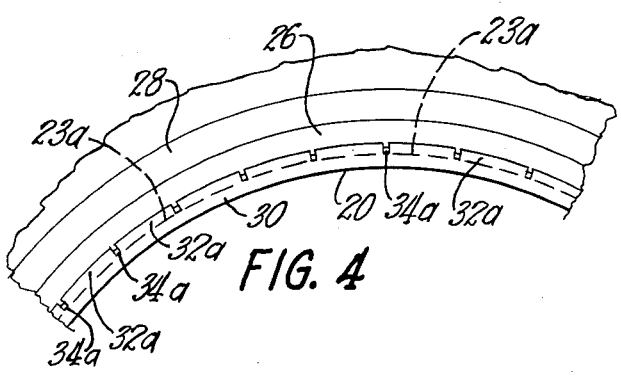
FIG. 4 is a schematic fragmentary plan view along the line 4—4 of the blower of FIG. 3, excluding the blower cap.
Figure 6:
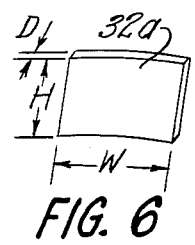
FIG. 6 is a schematic view in perspective of a slot according to the principles of this invention.

As shown in FIGS. 3, 4 and 6, the blower of the invention utilizes slots 32a with aspect ratios much greater than 1. Preferably, the aspect ratio is within the range of from about 35 to about 70. More preferably, the aspect ratio is within the range of from about 40 to about 60. Most preferably, the aspect ratio is about 50. The blower using slots having large aspect ratios, within the ranges of this invention, produces jets of attenuating gases which decay at a rate slower than that of jets produced by slots having lower aspect ratios. This enables the blower to have a greater attenuating efficiency, and thereby utilize less attenuating gas.

As compared with the lands of the prior art blower, lands 34a of the blower of this invention do not have the same width. Preferably, the width of the slots is within the range of from about 5 to about 10 times the width of the lands between the slots.

EXAMPLE

A blower of the invention having slots with an aspect ratio of 57 (depth of 0.007 inches and width of 0.4 inches) was positioned to attenuate the fibers centrifuged from a spinner. A manometer reading indicating flow of attenuating air into the blower manifold indicated an air flow of 225 scfm, as compared with a standard flow of 300 scfm in a typical prior art blower having slots with an aspect ratio of 1. Thus, an energy savings of approximately 25% was achieved. Also, the fibers produced by the blower of the invention were attenuated to a final diameter of 22 hundred thousandths of an inch as compared with 25 hundred thousandths of an inch diameter fibers produced by the blowers of the prior art.

It will be evident from the foregoing that various modifications can be made to this invention. Such, however, are considered as being within the scope of the invention.

INDUSTRIAL APPLICABILITY

This invention will be found useful in the production of glass fibers for such uses as thermal insulation and acoustical insulation products.

I claim:

1. Apparatus for producing glass fibers comprising a rotatably mounted spinner having a perhiperal wall with orifices, means for rotating the spinner, means for feeding molten glass to the spinner, such molten glass being emitted from the orifices as fibers during rotation of the spinner, an annular blower for attenuating fibers positioned circumferentially around the spinner comprising an annular manifold and a plurality of slots positioned circumferentially around the blower for the discharge of attenuating gas from said manifold, said slots having an aspect ratio within the range of from about 35 to about 70.

2. The blower of claim 1 in which the aspect ratio of said slots is within the range of from about 40 to about 60.

3. The blower of claim 1 in which the aspect ratio of said slots is about 50.

4. The blower of claim 1 in which the width of said slots is within the range of from about 5 to about 10 times the width of the lands between said slots.

5. Apparatus for producing mineral fibers comprising a rotatable mounted spinner having a peripheral wall with orifices, means for rotating the spinner, means for feeding molten mineral material to the spinner, such molten material being emitted from the orifices as fibers during rotation of the spinner, an annular blower for attenuating mineral fibers positioned circumferentially around the spinner comprising an annular manifold and a plurality of slots positioned circumferentially around the blower for the discharge of attenuating gas from said manifold in a downward direction, said slots having an aspect ratio within the range of from about 35 to about 70.

6. The blower of claim 5 in which the aspect ratio of said slots is within the range of from about 40 to about 60.

7. The blower of claim 5 in which the aspect ratio of said slots is about 50.

8. The blower of claim 5 in which the width of said slots is within the range of from about 5 to about 10 times the width of the lands between said slots.

* * * * *